(12) United States Patent
Pickett

(10) Patent No.: US 6,374,400 B1
(45) Date of Patent: *Apr. 16, 2002

(54) CODE SERVER

(75) Inventor: Stephen F. B. Pickett, Vancouver (CA)

(73) Assignee: REC Software, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/107,092

(22) Filed: Jun. 29, 1998

Related U.S. Application Data

(63) Continuation of application No. 08/840,197, filed on Apr. 11, 1997, now Pat. No. 5,854,936, which is a continuation of application No. 07/748,462, filed on Aug. 22, 1991, now Pat. No. 5,649,204.

(51) Int. Cl.[7] .............................. G06F 9/30
(52) U.S. Cl. ........................ 717/10; 709/331
(58) Field of Search ................ 709/100, 203, 709/331; 717/3, 10, 203

(56) References Cited

U.S. PATENT DOCUMENTS

| | | | | |
|---|---|---|---|---|
| 4,809,170 A | * | 2/1989 | Leblang et al. | 707/203 |
| 5,247,679 A | * | 9/1993 | Kumar | 395/710 |
| 5,303,376 A | * | 4/1994 | Taki | 395/710 |
| 5,649,204 A | * | 7/1997 | Pickett | 395/710 |
| 5,838,910 A | * | 11/1998 | Domenikos et al. | 709/203 |
| 5,854,936 A | * | 12/1998 | Pickett | 395/710 |

* cited by examiner

*Primary Examiner*—St. John Courtenay, III
*Assistant Examiner*—Van H. Nguyen
(74) *Attorney, Agent, or Firm*—Kevin L. Russell of Chernoff, Vilhauer, McClung & Stenzel, LLP

(57) ABSTRACT

A code server operates in a data processing system having an operating system or environment, such as OS/2 or Windows, which processes coded programs in discrete code modules. The code server maintains linkage information between the various code modules forming an association representing all the linkage data for the entire program. This information is gathered by way of searching through the files of the computer network or by direct insertion into the code module information table. Once the associative data has been gathered, a coded program may be retrieved quickly and efficiently without the need for repetitive on-line searching because the user need refer only to the code server which contains a look-up tables storing the data representing the associative information.

8 Claims, 5 Drawing Sheets

CODE SERVER

This application is a continuation of U.S. Ser. No. 08/840,197, filed Apr. 11, 1997, now U.S. Pat. No. 5,854,936 which is a continuation of U.S Ser. No. 07/748,462, filed Aug. 22, 1991 now U.S Pat. No. 5,649,204.

The following invention relates to a code server operating in a multi-module operating system and more, particularly to a code server which can efficiently identify and provide modules of program code quickly and efficiently to a user.

A multi-module operating system includes programs consisting of dynamically linked code modules that contain embedded references to other modules. The resolution of these external references occurs at run time under control of the operating system. The code modules can act as individual entities having knowledge of existence of other modules and frequently possess the ability to call into, or jump into, or otherwise pass program control to external code modules.

When an operating system, such as OS/2 or an environment such as Windows, is resolving these external references, the code module information is gathered. This information may contain anything that a user needs such as location, length, format, translated file information and a list of external references for each code module. Associative information may be defined as the intermodule relationship for a particular code module.

Multi-module systems such as OS/2 and Windows have a set rule for locating the required code modules by searching through local directories and directories attached through a network to locate the code modules and extract the needed code module information. Under OS/2 this is called LIBPATH and is called PATH under both Windows and DOS. The time needed to associate code modules in this way remains constant and in the absence of sufficient disk caching does not change irrespective of the number of times the same program is called, either for the same or for a different user. This is an inefficient method for associating programs.

Moreover, when code files such as applications programs are stored at locations that are remote from the ultimate program user, the operating system must view any remote file server as a storage device that contains executable files. This is in fact no different from a local storage device such as a hard or floppy disk. There are, however, numerous disadvantages to this arrangement. For example, multiple copies of code files can become scattered between a user work station and the server which makes it extremely difficult to maintain with current program updates. Also, network traffic can become dominated by remote requests for file access during association. This tends to slow down the network, and, frequently, users simply copy all of the code files onto a local hard disk to solve the problem. In the latter case coordinated updates become difficult and often storage space is wasted. Also, the file server must have one copy of the code file for each and every configuration of target machine. Finally, in a single computer multi-tasking system, so much swapping can be caused by the action of reading and rereading the code file data that the process of association completely dominates the useful work being done by the machine.

SUMMARY OF THE INVENTION

According to the present invention a code server is provided which stores the information generated when code modules are associated. This information is stored in a table form at the code server, and when the program is requested by a user, the code server queries its tables to see if the information for that program or module is already stored. This greatly reduces the search time required to locate the same information as a result of subsequent requests which would normally occur by searching in various directories. As a result, the network is less loaded. There is less traffic generated by needless search requests. Code files can be maintained efficiently because there will be no need to have multiple copies of the same code stored in local storage devices where it may be difficult to locate in the event that updates are necessary.

The code server of the present invention operates in a data processing system having an operating system which processes coded programs in discrete modules. The code server, which provides information to users of the data processing system, includes an information storage table containing linkage information needed to form an association between discrete modules of code forming at least parts of a coded program, and includes the capability for updating the information storage table as a result of search requests for coded programs whose association data was not previously included in the information storage table.

The code server may also include a translation function for translating from an intermediate code so that the resultant, final code may be used on different types of machines. Information relating to the translated or nontranslated status of code modules may also be stored in the code server tables.

It is a principal object of this invention to provide a code server in a multi-module operating system which can provide information linking coded modules to a requesting user in a fast and efficient manner.

It is a further object of this invention to provide a code server for users of a multi-module operating system which maintains a status information look-up table containing association data pertaining to modules of code thus lessening the need for local storage of coded programs.

Yet a further object of this invention is to provide a code server which can maintain coded programs in a centralized fashion.

Still a further object of this invention is to provide a code server in a multi-module operating system or environment which includes a storage information table which automatically learns association data linking various coded modules together as modules are requested by a user.

The foregoing and other objectives, features and advantages of the invention will be more readily understood upon consideration of the following detailed description of the invention, taken in conjunction with the accompanying drawings.

DETAILED DESCRIPTION OF THE INVENTION

Figure 1:
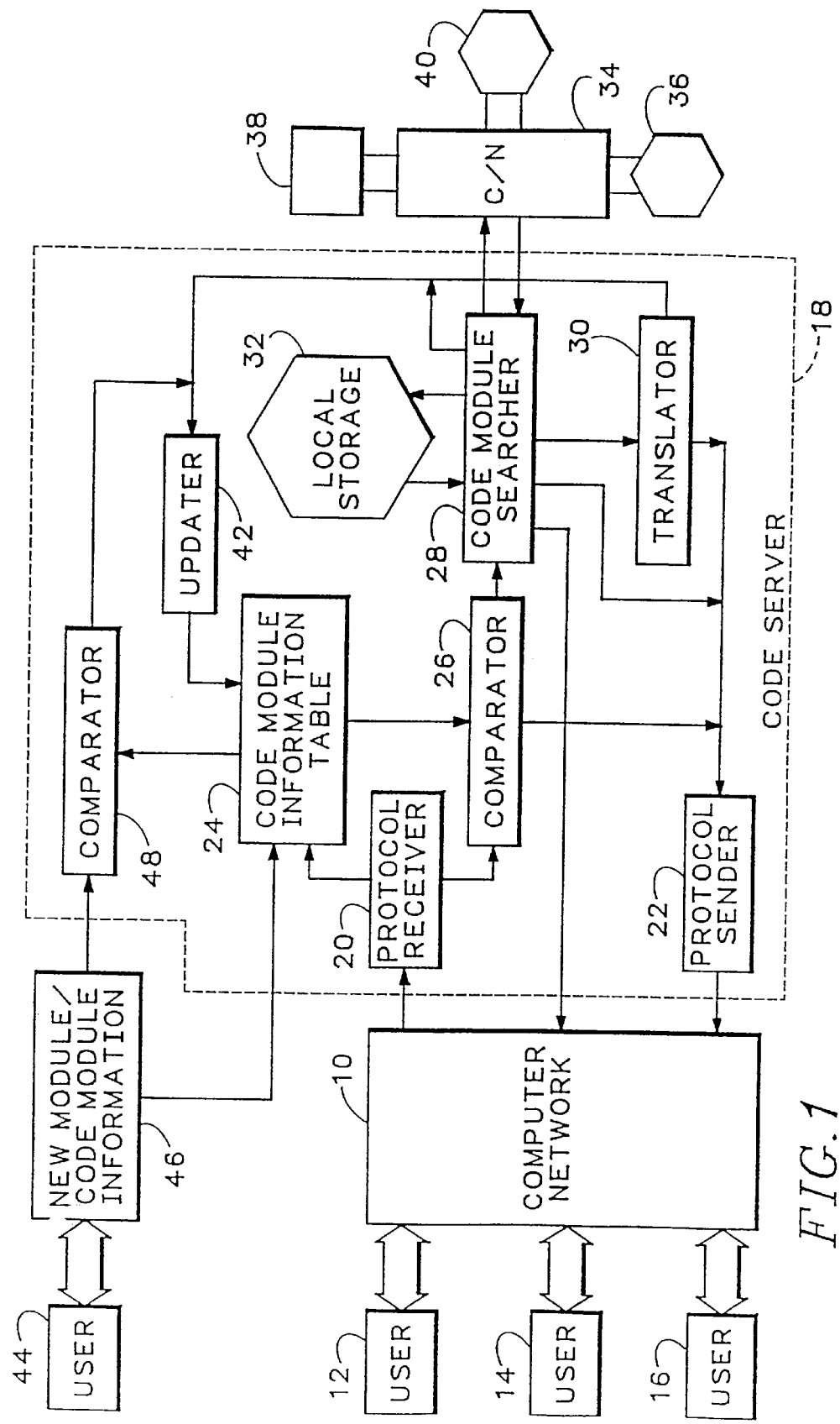
FIG. 1 is a block schematic diagram of a computer system employing the code server of the present invention.

A computer system employing the present invention includes a computer network 10 coupled to a number of users 12, 14 and 16. The users may be computer terminals coupled to the network or may be other computer systems. The present invention works in the environment of a multi-module operating system or environment such as OS/2 or Windows, in which programs that run on the system are configured in modules. A multi-module environment may also be created for systems such as MS DOS by the use of overlays which provide the functionality of a multi-module system. As will be explained below with reference to FIG. 2, these modules contain linkage information which point to additional modules and which collectively forms an association linking together at least parts of a complete program.

A code server 18 is coupled to the network 10. The code server 18 may be a separate outboard piece of hardware or may be built into the network or may also be a part of the operating system itself. The code server 18 is embodied in a transaction oriented protocol for communication between the user and the code server 18 which allows the users 12, 14, and 16 and the code server 18 to be on two remote computer systems or to be configured as separate disjoined tasks in a multi-processing system on a single computer. As such, the code server 18 includes a protocol receiver 20 and a protocol sender 22. An advantage of the protocol receiver and the protocol sender is that the server is relieved, as in all protocol-based systems, of the obligation to know the details of its ultimate client. This allows for effective and relatively easy communication between the code server 18 and the users 12, 14, and 16 which can be on the same type or on different types of machines because the data file contained in the protocol receiver 20 or the protocol sender 22 is the only concern. In essence, no user needs to know anything about the operation of the code server 18 apart from what data to include in the protocol. The protocol may contain anything needed for effective communication between the code server and the user. Examples may include, but are not limited to, the following request types: code module request, code server responses, unresolved references list, information on the user's setup such as screen type, drives, color, numeric processor, communication device, network card, memory type and amount, processor and printer. In response to further protocol requests the code server 18 can send code modules via the protocol sender 22 or by other means to a user 12, 14, 16.

The code server 18 includes a code module information table 24 which'stores information that links modules of coded programs together. The output of the code module information table 24 is connected to a comparator 26 which can be any device or software sub-routine used for comparing the output of the code module information table 24 to the received protocol. The output of the comparator is coupled to both the protocol sender 22 and to a code module searcher 28. The code module searcher 28 is connected to a translator 30 and to local storage 32. Yet another output of the code module searcher 28 is coupled to a wholly separate computer network 34 which consists of its own disk drive 36, users, generally designated at 38, or other storage devices 40.

The code module searcher also has an output coupled to an updater 42 which is coupled, in turn, back to the code module information table 24. The importance of the update function will be explained below in connection with system operation. Other users may access the code server such as those who would perform maintenance on existing code or who would install new programs and/or modules. In such cases a new user 44 provides a new module or code module information 46 to a comparator 48. The comparator 48 compares the new module or module information with that which is already stored in the code module information table 24. If the information is new or different, it is provided to the updater 42 which inserts the new information at its proper place in the information table 24.

Figure 2:
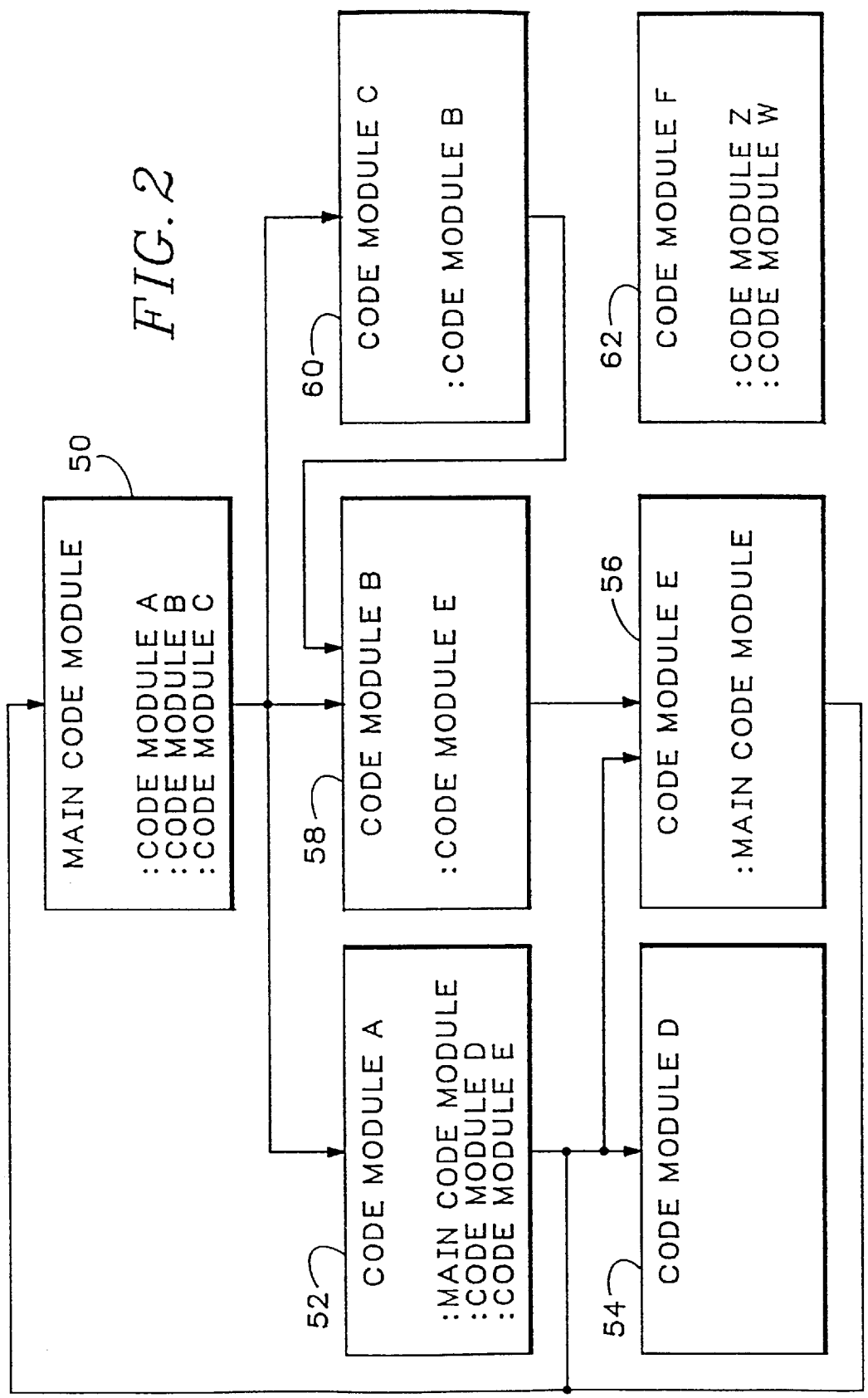
FIG. 2 is a schematic diagram of a coded program divided into modules where the modules include associative data linking the modules together.

FIG. 2 illustrates the way in which a typical program might be configured in modules in order to run in a multi-module operating system or environment such as OS/2 or Windows. The main code module 50 includes linkage information linking it with code module A, code module B and code module C. Code module A designated at 52 contains linkage information to the main code module 50, code module D 54 and code module E 56. Code module D 54 stands alone while code module E 56 links back to the main code module 50. Code module B 58 contains linkage information to code module E and code module C 60 is linked to code module B. Code module F 62 is linked to two other code modules not shown and is not part of the program formed by code modules A through E and the main module, although it exists in a file in the same memory, or in another location in the computer network. Collectively the linkage information referred to above forms an associative set for the main code module and code modules A through E. However, there is no association with code module F or its linked modules, code module Z and code module W. It is this type of associative information that is stored in the code module information table 24 in FIG. 1. A request by a user for a particular code module will immediately locate all of the associative information pertaining to that module in the code module information table 24 if it has been previously stored there.

Figure 3:
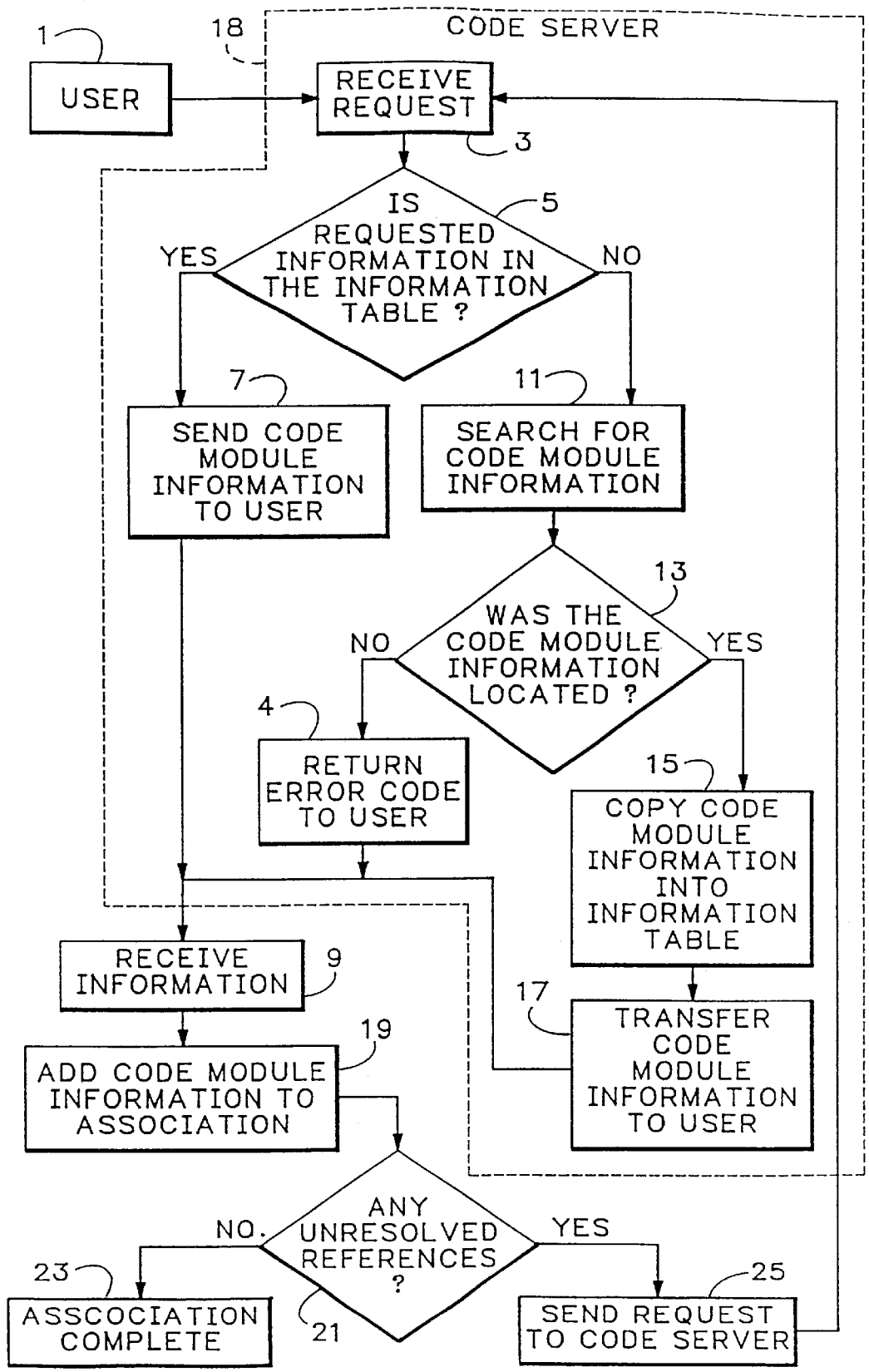
FIG. 3 is a flow chart diagram illustrating the manner in which the code server of the present invention develops an information storage table containing associative data l inking various coded modules.

An illustration of how the system operates is illustrates in FIG. 3. A user 1 places a request on the network which is received by the protocol receiver 20 at block 3. The protocol receiver 20 queries the code module information table at block 5 to determine if the requested information is already in the information table. If the answer is yes, the code server 18 at block 7 sends the code module information to the user. It does this by comparing the request with the information in the code module information table 24 in the comparator 26 to make sure that the information being sent is the information requested as interpreted by the protocol receiver 20. The user may then receive the information at block 9. If the requested information is not stored in the code module information table the answer at block 5 is "no" and a search indicated at block 11 is conducted for the module information. The search is performed by the code module searcher 28 which looks for the information in local storage 32 or in the computer network 34 which may include a user 38, hard storage devices 40 or a local drive or storage unit indicated at 36. The searcher 28 may also query users 12, 14 and 16. The method for searching for code module linkage information is the conventional method that would ordinarily be undertaken by the operating system in the absence of a code server. Also, within the protocol the user may at any time send variations in the search order for locating files. For example,the user may send an entire list of places to search for the code modules, tell the code server a file containing a list of places to search, or insert an additional search location into an existing search list.

The insertion of a new search location can be at any place in the search list. Placing the additional search location at the beginning of the list provides the opportunity to selectively change to a new location to find a first code module that one may wish to use in preference to a second code module that would be located elsewhere under a search location placed later in the search list. In essence, this allows the user to selectively decide on which code module, if two or more exist, he would prefer associated at any particular time.

When the code module searcher 28 determines at block 13 whether the code module information was located, it copies the code module information into the code module information table 24 as indicated at block 15. After this, as indicated at block 17, the code module information is transferred to the user. If not enough information on the module is found, or in the case that translation is necessary and translation cannot for any reason be completed, an error message with codes and subcodes to indicate the precise source and type of failure is returned to the user as indicated at block 4.

The user then adds this code module information to his internal association table. This function is indicated at block 19 in FIG. 2. The user then determines if there are any unresolved references at block 21. If the answer is "no" the association of code modules is complete as indicated in block 23 but if the answer is "yes" as indicated at block 25, a request is sent to the code server 18 as previously described.

As the code module association is being formed the information is stored in the code module information table 24 so that the next user who needs to associate the same code module will be able to locate it quickly without the time consuming effort of searching for this information directly. With the information stored in the look-up tables, the server's response time is very much faster than conventional methods.

A particular advantage of the present system is the ease in which coded programs may be maintained. Because the system spends less time searching for blocks of code in response to a user request, files may be stored in their expected locations and multiple copies of those files at local storage locations are no longer necessary.

Figure 4:
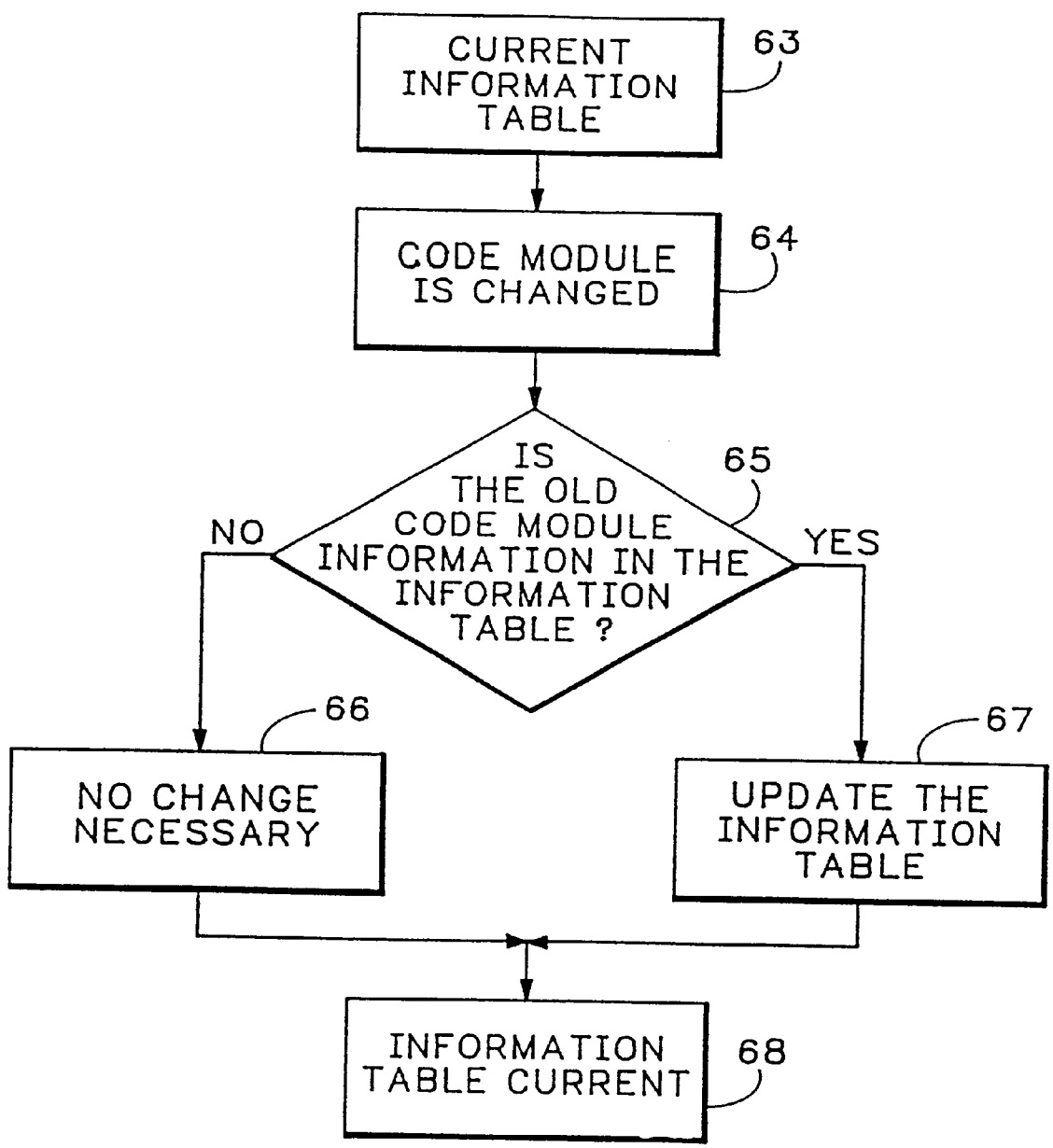
FIG. 4 is a flow chart diagram illustrating the way in which the information storage table in the code server is updated with new associative information.

When a code module is changed, such as by a user 44, the system automatically updates the code module information table as shown at block 63 of FIG. 4. To update, several options exist such as simply deleting the old data from the information table, clearing the total information table or by some means such as turning off and on the code server. In the latter case the information table will completely regenerate itself as code module information is requested from users. This code management is done in real time to replace old code module information with new code module information. Each time a code module is changed (block 64), the old code module information in the information storage table 24 is examined by comparator 48. The change either requires to change in the modulo linkage information (block 66) or requires an update (block 67). If no change is necessary (because upon request the code server will locate the desired modules), the information may be added to the information table by use of updater 42. This will result in no search being required upon the first request for code module information. In either case the code module information table 24 is maintained as current (block 68).

Referring to FIG. 3, Block 23 reflects the current status of the code module information table 24. The information table 24 preferably contains code module information on both untranslated and translated code modules because the storage space needed for such an information table is relatively small.

Figure 5:
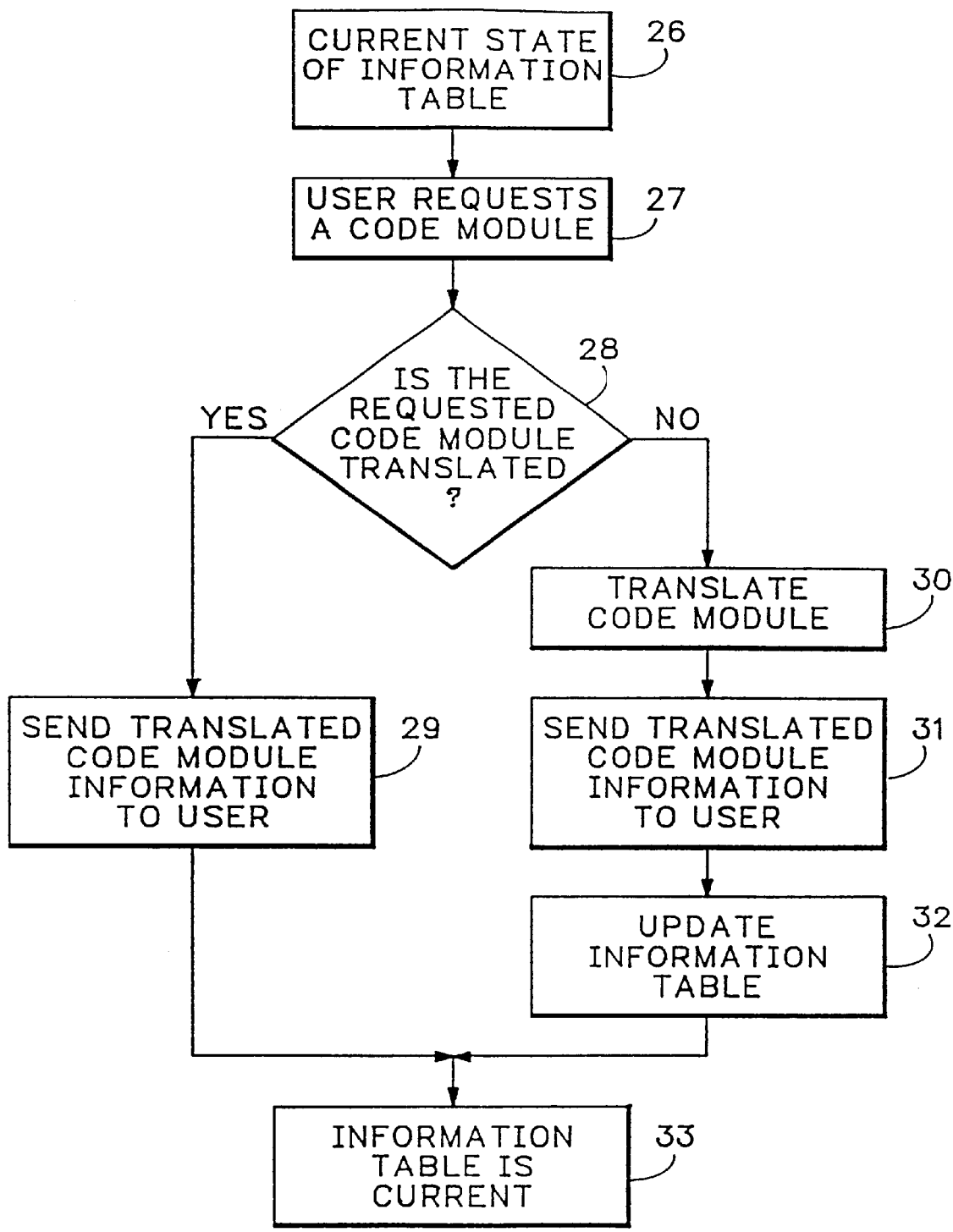
FIG. 5 is a flow chart diagram illustrating the interaction of a code translator in the code server with the information storage table.

Generally referring to FIG. 5, a further application of the code server is to manage the translation of code from one form to another. The preparation of code for execution of a particular system may involve a translation of code. Some examples include, source to object code, one machine format to another machine format, compilation from one operating system to another operating system, and, preferably, a machine independent format to a machine specific format. Though the code server could do the translations, it is preferable that the code server simply oversee the translations done by other programs.

Referring to FIG. 5, a user requests a code module from the code server as indicated at Block 27. The current state of the information table is indicated at Block 26. Assuming that the code module is known to the code server 18 and has translated and/or untranslated code module information in the code module information table 24, then the code server 18 determines at Block 28 whether the requested code module is translated. This is a check to determine if the requested translated code module information is in an appropriate form for the particular users' system. If the information table 24 contains information on translation indicating a program which would be transportable to the user system, then this translated information is transferred to the user as illustrated in Block 29. It should also be noted that code module information for an untranslated code module could be sent to the user if it was usable in its then current form. If the information table 24 does not contain code module information as to translation status and if the user requires translated code, at Block 30 the module is translated. At Block 31 the translated information is returned to the user and in addition, the translation information is transferred to the updater 42 so that the code module information table may be updated to now show a translated code module. The end result is that the information table 24 is maintained in a current condition with the latest update of module association information, regardless of whether the code modules are to be translated to p-code, some other code, or remain in their original format.

The process of translating files upon request, however, drastically reduces the required storage because there is no longer any need for servers to store all executable files for all possible systems and configurations that might be needed. The best distribution format for code is in an intermediate form such as P-Code (pseudo code) or a compiler-generated parse tree as they are relatively portable and generally more compact than executable code. Preferably the user-developer transforms this source cede to intermediate code and the code server 18 controls the transformation of intermediate code to executable code.

For example, in an office setting with 20 word processors connected to a network, all starting up the same word processing program from the network, the server response time is slow. With the code server and code in an intermediate form, once the first translation has occurred, then the access for the remaining users is almost instantaneous because the need for retranslation has been eliminated. This speed enhancement is equally applicable when the translating of code is not required but only the forming of the association is needed because the information table will contain all the needed code module information. For added flexibility for different user systems, machine dependent modules can also be used. It is apparent that in addition to a considerable time savings in performing association, another significant time savings will be realized by only having to translate code modules once for a particular user configuration.

An added advantage of the code server is the ability to use the information table on a per user basis. This can be done with several information tables or one information table with fields denoting which code module information goes to which user or users. A limitation in prior multi-module systems such as OS/2, is that the LIBPATH instructions to tell the machine where to search for code modules were not changeable without restarting the system. The code server's information table is functionally equivalent to LIBPATH and can be changed at any time, in real time, which is an added advantage.

With the server environment and changeable information tables, there is no assumption that all users have the same information table. For example, two developers can be writing different versions of the same program with the same module name and the code server can keep track of each file separately for each developer. Multiple information tables can provide user-specific association.

After completing the association the server then enables the user to execute the program by some means such as sending the files in response for each request for a piece of code, notifying the system that the user already has the code, transferring the files asynchronously, sending each module as the computer accesses it, sending code as needed, executing code via remote procedure calls, or informing the user as to other locations where the required code modules can be located. Another added feature involves using a Cyclic Redundancy (or similar) Checksum (CRC) that embeds specifics of the user system placed with the information table for comparison of the new user's system to determine if the files need to be retranslated. For example, if the old CRC and a new request from a user sending his CRC do not match, then the previous files may not be compatible and require retranslation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited on by the claims which follow.

What is claimed is:

1. A method of processing data on a computer system, said computer system having an operating system for managing coded programs in discrete modules, comprising the steps of:

(a) receiving a request from a user specifying particular coded program module to be run on the computer system;

(b) searching in a code module information table for associative data linking said particular coded program module with related program modules;

(c) in the event that the association data is incomplete, initiating a search subprogram to locate linkage information between coded modules to complete said associative (d) updating the code module information table with linkage information found as the result of step (c); and (e) providing said linkage information to said user.

2. The method of claim 1, further including the step of translating the code modules located as a result of the search subprogram to an intermediate code and updating the code module information table to indicate that said code modules have been translated.

3. In a computer system having an operating system for processing coded programs in discrete modules, a code server comprising a code module information table containing linkage information between modules of a particular coded program, and means for generating said linkage information from said information table in response to a request from a user for a module of a particular coded program.

4. The code server of claim 3, further including search means for locating code module linkage information and means for updating the code module information table when such information is found, to form a complete set of associative data for a particular coded program module.

5. The code server of claim 4, further including means for subsequently loading new linkage information directly into the code module information table.

6. The code server of claim 3, further ram including means for overseeing the translation of code modules of said particular coded program from an intermediate code and for updating said code module information table to indicate as part of said association that said code modules have been translated.

7. The method of claim 1, further including the step of transferring said coded program module to said user.

8. The method of claim 1, further providing a transaction-oriented protocol between said user and said operating system.

* * * * *

UNITED STATES PATENT AND TRADEMARK OFFICE
CERTIFICATE OF CORRECTION

| | |
|---|---|
| PATENT NO. | : 6,374,400 B1 |
| APPLICATION NO. | : 09/107092 |
| DATED | : April 16, 2002 |
| INVENTOR(S) | : Stephen F.B. Pickett |

It is certified that error appears in the above-identified patent and that said Letters Patent is hereby corrected as shown below:

<u>Col. 2, lines 63-64</u>

Change "data l inking" to --data linking--.

<u>Col. 3, line 64</u>

Change "designated at,38" to --designated at 38--.

<u>Col. 4, line 39</u>

Change "illustrates" to --illustrated--;

<u>Col. 4, line 64</u>

Change "example,the" to --example, the--.

<u>Col. 8, line 1 claim 1</u>

Change "specifying particular" to --specifying a particular--;

<u>Col. 8, lines 10-11 claim 1</u>

Change "said associative" to --said associative data--;

UNITED STATES PATENT AND TRADEMARK OFFICE
CERTIFICATE OF CORRECTION

PATENT NO. : 6,374,400 B1
APPLICATION NO. : 09/107092
DATED : April 16, 2002
INVENTOR(S) : Stephen F.B. Pickett It is certified that error appears in the above-identified patent and that said Letters Patent is hereby corrected as shown below:

<u>Col. 8, line 37 claim 6</u>

Change "further ram including" to --further including--.

Signed and Sealed this

Third Day of June, 2008

JON W. DUDAS
*Director of the United States Patent and Trademark Office*